United States Patent [19]

Dayan et al.

[11] Patent Number: 5,187,792
[45] Date of Patent: Feb. 16, 1993

[54] METHOD AND APPARATUS FOR SELECTIVELY RECLAIMING A PORTION OF RAM IN A PERSONAL COMPUTER SYSTEM

[75] Inventors: Richard A. Dayan; Son H. Lam, both of Boca Raton, Fla.; John P. Zimmerman, Austin, Tex.

[73] Assignee: International Business Machines Corporation, Armonk, N.Y.

[21] Appl. No.: 521,050

[22] Filed: May 9, 1990

[51] Int. Cl.$^5$ .............................................. G06F 9/46
[52] U.S. Cl. ................................. 395/725; 395/700; 364/243.1; 364/245.31; 364/245.7; 364/964.2
[58] Field of Search ............... 395/425, 725, 750, 700; 364/DIG. 1, DIG. 2

[56] References Cited

U.S. PATENT DOCUMENTS

| | | | |
|---|---|---|---|
| 4,787,032 | 11/1988 | Culley | 395/725 |
| 4,849,875 | 7/1989 | Fairman | 395/425 X |
| 4,985,871 | 1/1991 | Catlin | 365/230.06 |
| 5,021,983 | 6/1991 | Nguyen et al. | 364/707 |

OTHER PUBLICATIONS

IBM Technical Disclosure Bulletin, vol. 25, No. 7B, Dec. 1982, "Program-Controlled Paging Scheme for Memory Expansion", Skelton.

Primary Examiner—Michael R. Fleming
Assistant Examiner—Clifford Knoll
Attorney, Agent, or Firm—Stephen A. Terrile; Winfield J. Brown, Jr.

[57] ABSTRACT

An apparatus and method for reclaiming a portion of random access memory in a personal computer system. The personal computer system comprises a system processor, a memory controller, a random access main memory, a read only memory, and at least one direct access storage device. The read only memory includes operating system microcode. The memory controller regulates communications between main memory and the system processor. In response to signals from the system processor, the memory controller can either execute the microcode out of the read only memory and recover main memory previously used to store the microcode, or disable read only memory, copy the microcode to main memory and execute the microcode out of main memory.

3 Claims, 6 Drawing Sheets

METHOD AND APPARATUS FOR SELECTIVELY RECLAIMING A PORTION OF RAM IN A PERSONAL COMPUTER SYSTEM

FIELD OF THE INVENTION

This invention relates to a personal computer system having a random access memory (RAM) and a read only memory (ROM) and in particular to a method and device for a programmable address modification system to advantageously use the ROM while reclaiming a portion of the RAM.

BACKGROUND DISCUSSION

Personal computer systems in general and IBM personal computers in particular have attained widespread use for providing computer power to many segments of today's modern society. Personal computer systems can usually be defined as a desk top, floor standing, or portable microcomputer that includes a system unit having a system processor, a display monitor, a keyboard, one or more diskette drives, a fixed disk storage, and an optional printer. One of the distinguishing characteristics of these systems is the use of a motherboard or system planar to electrically connect these components together. These systems are designed primarily to give independent computing power to a single user and are inexpensively priced for purchase by individuals or small businesses. Examples of such personal computer systems are IBM's PERSONAL COMPUTER AT and IBM's PERSONAL SYSTEM/2 Models 25, 30, 50, 60, 70 and 80.

These systems can be classified into two general families. The first family, usually referred to as Family I Models, use a bus architecture exemplified by the IBM PERSONAL COMPUTER AT and other "IBM compatible" machines. The second family, referred to as Family II Models, use IBM's MICRO CHANNEL bus architecture exemplified by IBM's PERSONAL SYSTEM/2 Models 50 through 80. The Family I models typically have used the popular INTEL 8088 or 8086 microprocessor as the system processor. These processors have the ability to address one megabyte of memory. The Family II models typically use the high speed INTEL 80286, 80386, and 80486 microprocessors which can operate in a real mode to emulate the slower speed INTEL 8086 microprocessor or a protected mode which extends the addressing range from 1 megabyte to 4 Gigabytes for some models. In essence, the real mode feature of the 80286, 80386, and 80486 processor hardware compatibility with software written for the 8086 and 8088 microprocessors.

Beginning with the earliest personal computer system of the family I models, such as the IBM Personal Computer, it was recognized that software compatibility would be of utmost importance. In order to achieve this goal, an insulation layer of system resident code, also referred to as "microcode", was established between the hardware and software. This code provided an operational interface between a user's application program/operating system and the device to relieve the user of the concern about the characteristics of hardware devices. Eventually, the code developed into an integral piece of hardware and became known as BASIC input/output system or BIOS. BIOS allowed new devices to be added to the system, while insulating the application program from the peculiarities of the hardware. The importance of BIOS was immediately evident because it freed a device driver from depending on specific device hardware characteristics while providing the device driver with an intermediate interface to the device. For example, a BIOS diskette module permits a programmer to program the diskette drive without an indepth knowledge of the diskette drive hardware. Thus, a number of diskette drives designed and manufactured by different companies can be used in the system.

Since BIOS was an integral part of the system and controlled the movement of data in and out of the system processor, it was resident on the system planar and was shipped to the user in a read only memory (ROM). For example, BIOS in the original IBM Personal Computer occupied 8 K of ROM resident on the planar board.

As new models of the personal computer family were introduced, BIOS had to be updated and expanded to include new hardware and I/O devices. As could be expected, BIOS started to increase in memory size. For example, with the introduction of the IBM PERSONAL COMPUTER AT, BIOS grew to require 32 K bytes of ROM. Today, with the development of the Family II machines, BIOS has grown to require 128 K bytes of memory. Unfortunately, because of system constraints, this turned out to be the maximum capacity available for BIOS.

In today's memory chip technology, BIOS execution from ROM is slower than execution from RAM. ROM is usually not implemented as fast or in the same data width as RAM. Since marketability and consumer acceptance of personal computer systems is very sensitive to execution time, it was desirable to have BIOS being executed out of RAM. Thus, to speed up the execution (decrease execution time) of BIOS, BIOS was copied from the ROM resident on the planar to RAM. This permitted BIOS to execute as fast as software coexistent in the RAM (typically the operating system and application programs). However, since BIOS occupies 128 K bytes of RAM, the operating system and user application program space must relinquish the use of this particular area of RAM. In a minimally configured system for memory (1 Megabyte), the user will lose the capability to execute certain applications that require at least one megabyte of memory to run.

Referring to FIG. 1, there is shown a memory map of a previous personal computer system helpful in explaining the problem with previous systems. RAM 2 as depicted, is a one megabyte physical memory module that includes a first portion of memory or conventional memory (0–640 K) for application programs, and a second portion of memory (640–1024 K) typically reserved for the operating system. Logical memory 4 is the memory map that the system processor addresses. In this case, the system processor can address 0–1408 K or includes 384 KB of additional memory. The additional memory will become apparent with respect to the discussion that follows. A memory controller (not shown in FIG. 1) is responsible for translating the logical addresses to actual physical addresses.

The logical memory 4 is comprised of conventional memory (0–640 K), operating system memory (640–1024 K) and a third portion of logical memory (1024–1408 K). The logical conventional memory is identical to the physical conventional memory. That is, when the system processor addresses any location below 640 K, the memory controller will exchange information directly with the corresponding physical address memory location (0–640 K).

The operating system memory (640–1024 K) is further comprised of video memory (640–768 K), Adapter ROM (768–896 K), and BIOS (896–1024 K). However, the video memory, adapter ROM, and BIOS are actually included on other storage devices in the system and are not initially stored in RAM physical memory. For example, a separate storage device as ROM 6 includes BIOS, which as shown, can be mapped into 896–1024 K of logical memory space. That is, when the system processor addresses any location between E0000H-FFFFFH, the memory controller becomes inactive and a decoder on the ROM will cause information from ROM 6 to be read. However, since video memory, adapter ROM, and BIOS are actually stored on other physical devices, the RAM physical memory as shown between 640–1024 K will remain unused.

To remedy this problem, previous memory controllers could map any system processor addresses in the range from 1024–1408 K to RAM physical address 640–1024 K. Thus, the hardware while actually having one megabyte of physical RAM, could provide the operating system with 1408 K of total logical system memory. Specifically, when the system processor addresses any location greater than FFFFFH(1024 K), the memory controller exchanges information with a corresponding physical address between 640–1024 K. This resulted in one megabyte of memory being available for application programs (0–640 K and 1024–1408 K) if BIOS was executed out of ROM. However, this did not result in a satisfactory solution because as explained before, BIOS execution out of ROM is slow.

For some of today's systems BIOS being executed out of ROM was unacceptable and therefore BIOS was transferred to RAM to decrease execution time. This had the negative effect of decreasing application programs, memory to less than one megabyte of memory (898 K total). In previous system these situations were permanent, that is the user either got BIOS executing out of ROM (slower execution) or the user got BIOS executing out of RAM (faster execution) but less than one megabyte of memory. This became a problem with the marketability of the previous systems, because some users, depending upon usage, were willing to sacrifice memory for speed or vice versa, but were locked into a particular configuration depending upon machine model.

It should be appreciated that providing the user with the ability to dynamically configure the system with either sufficient memory or improving execution is a substantial factor in achieving marketability success. Thus, there exists a need for developing a method and apparatus to programmatically either enable BIOS to be executed out of ROM and to reclaim the RAM intended for storage and execution of BIOS; or to permit BIOS to be transferred and executed out of RAM for faster execution.

SUMMARY OF THE INVENTION

The present invention has been developed for the purpose of alleviating the above mentioned problems. Accordingly, the invention has as one of its objects an apparatus and method for selectively enabling BIOS to be executed out of ROM, while reclaiming the RAM previously intended for storage and execution of BIOS.

Another objective of the present invention is to provide an apparatus and method for dynamically permitting BIOS to be executed either out of ROM or RAM.

Yet another objective of the present invention is to provide an apparatus and method which permits the system to programmatically decide whether to run BIOS out of ROM or RAM.

Another objective of the present invention is the ability to provide the user a choice in the memory configuration of his machine.

Broadly considered, a personal computer system according to the present invention comprises a system processor, a random access main memory, a read only memory having BIOS, and a memory controller electrically coupling the random access main memory to the system processor. During a first phase of operation, BIOS is copied from the read only memory to random access main memory and executed out of random access main memory. Under program control from the system processor the memory controller can cause a second phase of operation in which BIOS is executed out of the read only memory, while reclaiming the portion of random access main memory previously intended for storage and execution of BIOS. The memory controller can further switch the system between the first and second phases of operation during normal operation of the machine.

BRIEF DESCRIPTION OF THE DRAWINGS

The foreground aspects and other features of the present invention are explained in the following written description, taken in connection with the accompanying drawings, wherein.

DESCRIPTION OF A PREFERRED EMBODIMENT

The following detailed description is of the best presently contemplated mode for carrying out the invention. This description is not to be taken in a limiting sense but is made merely for the purpose of illustrating the general principles of the invention since the scope of the invention is best defined by the appending claims.

Figure 1:
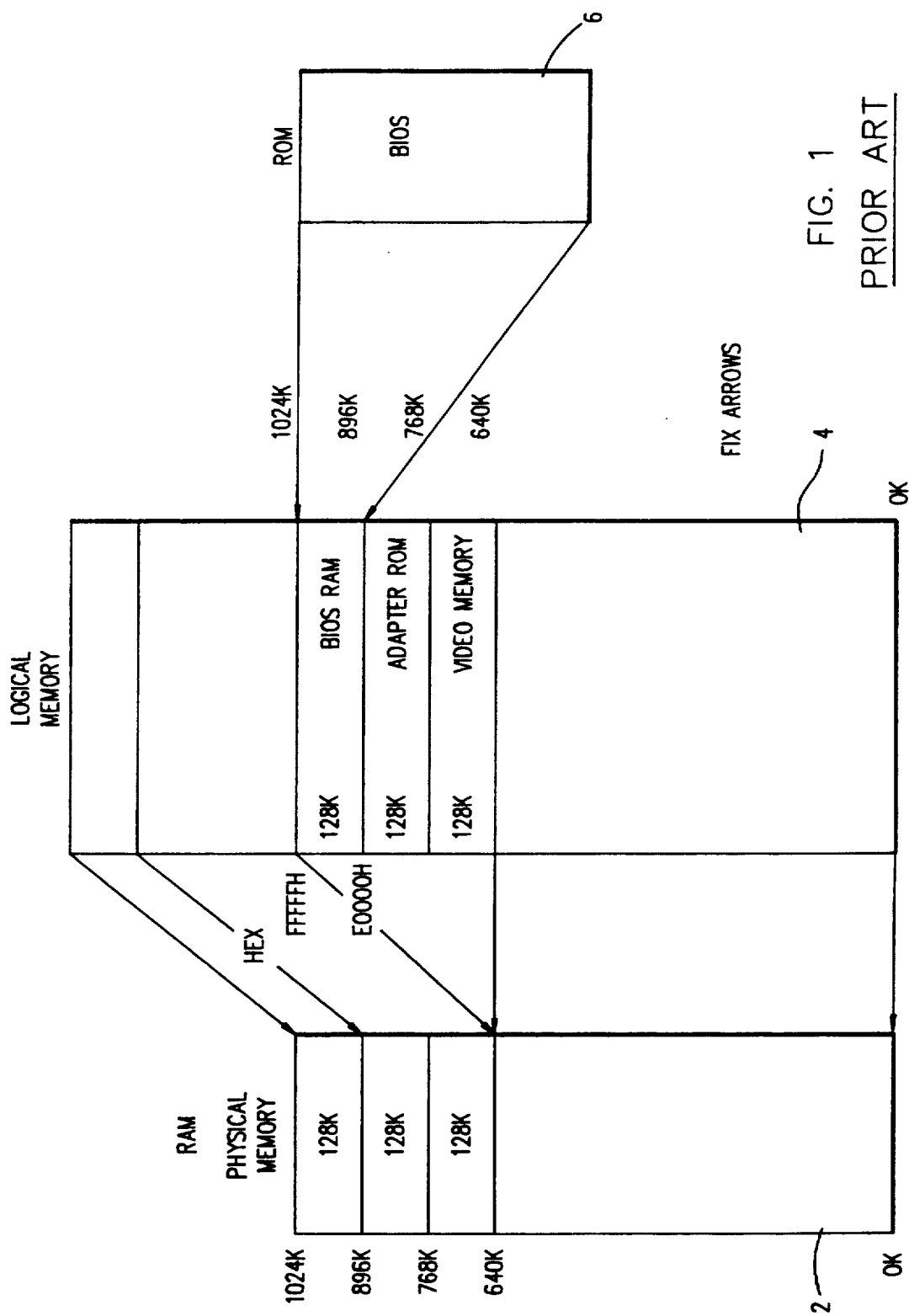
FIG. 1. illustrates a memory map generated by a memory controller of a previous system.
Figure 2:
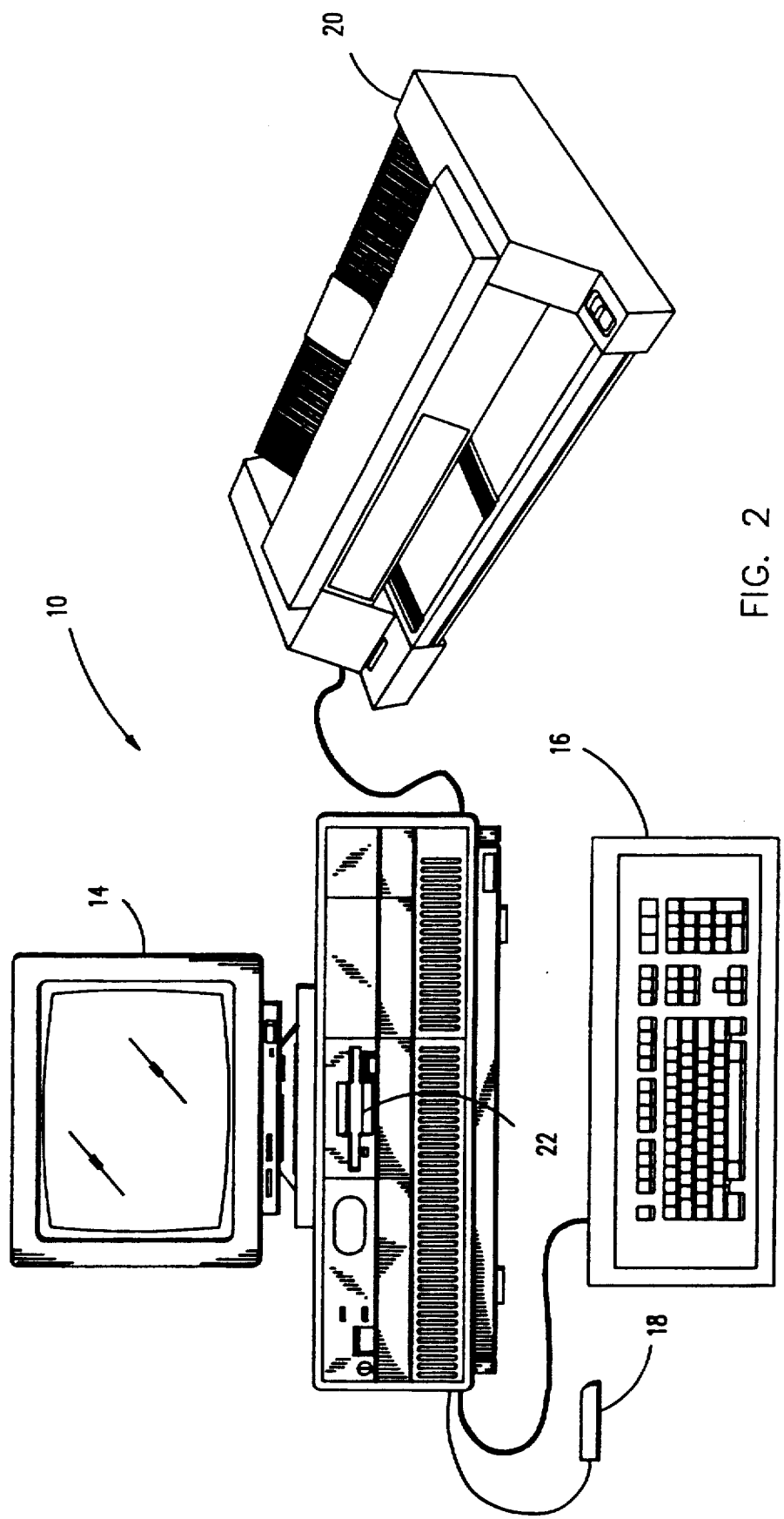
FIG. 2 illustrates a personal computer system showing a system unit connected to a plurality of devices.

Referring now to the drawings, and in particular to FIG. 2, there is shown a typical personal computer system 10 in which the present invention can be employed. As shown, the personal computer system 10 comprises a number of components which are interconnected together. More particularly, a system unit 12 is coupled to and drives a monitor 14 (such as a conventional video display). The system unit 12 is also coupled to input devices such as a keyboard 16 and a mouse 18. An output device such as a printer 20 can also be connected to the system unit 12. Finally, the system unit 12 may include one or more disk drives such as the diskette drive 22.

As will be described below, the system unit 12 responds to input devices such as the keyboard 16 and the mouse 18 and input/output devices such as the diskette drive 22 for providing signals to drive output devices such as the monitor 14 and the printer 20. Of course, those skilled in the art are aware that other conventional components can also be connected to the system unit 12 for interaction therewith. In accordance with the present invention, the personal computer system 10 includes a system processor that is interconnected to a random access memory (RAM), a read only memory (ROM), and a plurality of I/O devices such as the keyboard 16, mouse 18, diskette drive 22, monitor 14 and printer 20.

In use, the personal computer system 10 is designed primarily to give independent computing power to a small group of users or a single user and is inexpensively priced for purchase by individuals or small businesses. In operation, the system processor functions under an operating system, such as IBM's OS/2 Operating System or PC-DOS. This type of operating system includes a BIOS interface between the I/O devices and the operating system. BIOS which is initially stored in ROM on a motherboard or planar will hereinafter be referred to as ROM-BIOS. BIOS can also be copied to and executed out of RAM and hereinafter will be referred to as RAM-BIOS.

Figure 3:
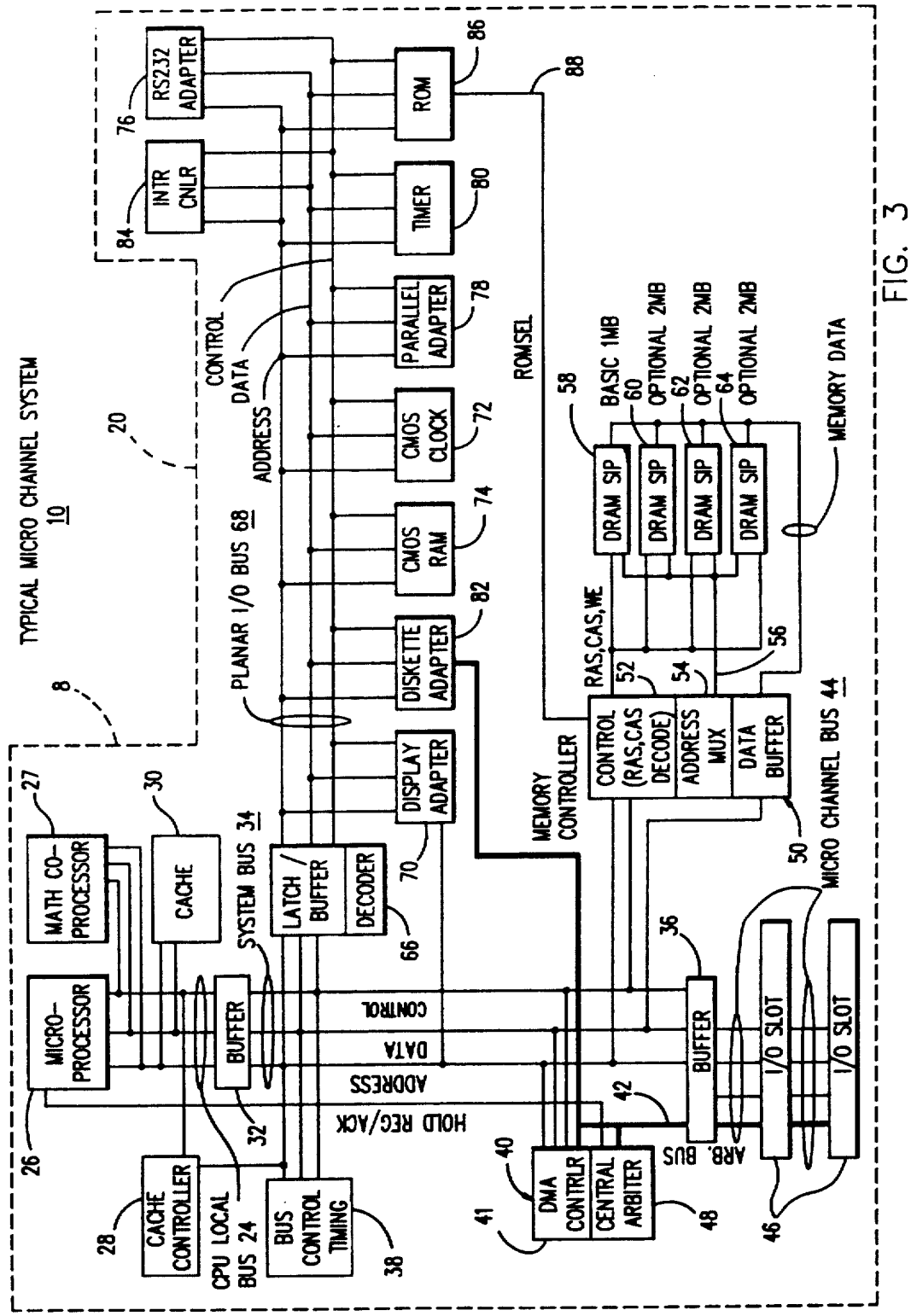
FIG. 3 shows a system block diagram for the personal computer system of FIG. 2.

Prior to relating the above structure to the present invention, a summary of the operation in general of the personal computer system 10 may merit review. Referring to FIG. 3, there is shown a block diagram of the personal computer system 10 illustrating the various components of the computer system 10 in accordance with the present invention. FIG. 3 further illustrates components of the planar 8 and the connection of the planar 8 to the I/O slots 46 and other hardware of personal computer system 10. Connected to the planar 8 is the system processor 26 comprised of a microprocessor which is connected by a high speed CPU local bus 24 through a bus control timing unit 38 to a memory control unit 50 which is further connected to a volatile random access memory (RAM) 58. While any appropriate microprocessor can be used, one suitable microprocessor is the 80386 which is sold by INTEL.

While the present invention is described hereinafter with particular reference to the system block diagram of FIG. 3, it is to be understood at the outset of the description which follows, it is contemplated that the apparatus and methods in accordance with the present invention may be used with other hardware configurations of the planar board. For example, the system processor could be an Intel 80286 or 80486 microprocessor.

Returning now to FIG. 3, the CPU local bus 24 (comprising data, address and control components) provides for the connection of the microprocessor 26, a math coprocessor 27, a cache controller 28, and a cache memory 30. Also coupled on the CPU local bus 24 is a buffer 32. The buffer 32 is itself connected to a slower speed (compared to the CPU local bus) system bus 34, also comprising address, data and control components. The system bus 34 extends between the buffer 32 and a further buffer 36. The system bus 34 is further connected to a bus control and timing unit 38 and a DMA unit 40. The DMA unit 40 is comprised of a central arbitration unit 48 and DMA controller 41. The buffer 36 provides an interface between the system bus 34 and an optional feature bus such as the MICRO CHANNEL bus 44. Connected to the bus 44 are a plurality of I/O slots 46 for receiving MICRO CHANNEL adapter cards which may be further connected to an I/O device or memory.

An arbitration control bus 42 couples the DMA controller 41 and central arbitration unit 48 to the I/O slots 46 and diskette adapter 82. Also connected to system bus 34 is a memory control unit 50 which is comprised of a memory controller 52, an address multiplexor 54, and a data buffer 56. The memory control unit 50 is further connected to a random access memory as represented by the RAM module 58. The memory controller 52 includes the logic for mapping addresses to and from the microprocessor 26 to particular areas of RAM 58. This logic is used to reclaim RAM previously occupied by BIOS and is further discussed with reference to FIGS. 4-5. Further generated by memory controller 52 is a ROM select signal (ROMSEL), that is used to enable or disable ROM 86. According to the present invention, memory controller 52 is also responsive to information transferred from the microprocessor to control certain functions of the memory controller 52. In particular, the microprocessor can read data from a non-volatile RAM 74 and transfer this information to the memory controller 52 for reclaiming RAM and enabling ROM 86 which is further discussed in detail with reference to FIG. 5.

While the microcomputer system 10 is shown with a basic 1 megabyte RAM module, it is understood that additional memory can be interconnected as represented in FIG. 3 by the optional memory modules 60 through 64. For purposes of illustration only, the present invention is described with reference to the basic one megabyte memory module 58.

A further buffer 66 is coupled between the system bus 34 and a planar I/O bus 68. The planar I/O bus 68 includes address, data, and control components respectively. Coupled along the planar bus 68 are a variety of I/O adapters and other components such as the display adapter 70 (which is used to drive the monitor 14), a clock 72, nonvolatile RAM 74 herein after referred to as NVRAM, a RS232 adapter 76, a parallel adapter 78, a plurality of timers 80, a diskette adapter 82, an interrupt controller 84, and a read only memory 86. The read only memory 86 includes the BIOS that is used to interface between the I/O devices and the operating system of the microprocessor 26. BIOS stored in ROM 86 can be copied into RAM 58 to decrease the execution time of BIOS. ROM 86 is further responsive (via ROMSEL signal) to memory controller 50. If ROM 86 is enabled by memory controller 52, BIOS is executed out of ROM. If ROM 86 is disabled by memory controller 52, ROM is not responsive to address inquiries from the microprocessor 26 (i.e. BIOS is executed out of RAM).

The clock 72 is used for time of day calculations and the NVRAM is used to store system configuration data. That is, the NVRAM will contain values which describe the present configuration of the system. For example, NVRAM contains information describing the capacity of a fixed disk or diskette, the type of display, the amount of memory, time, date, etc. Of particular importance NVRAM will contain data (can be one bit) which is used by memory controller 52 to determine whether BIOS is run out of ROM or RAM and whether to reclaim RAM intended to be used by BIOS RAM. Furthermore, these data are stored in NVRAM whenever a special configuration program, such as SET Configuration, is executed. The purpose of the SET Configuration program is to store values characterizing the configuration of the system to NVRAM.

Previous to the present invention, ROM 86 included all of the BIOS code which interfaced the operating system to the hardware peripherals which was transferred on start up to RAM 58 for execution. According to one aspect of the present invention, however, ROM 86 is adapted to execute BIOS whenever enabled by memory controller 52. When ROM-BIOS is executed by the system processor, the RAM-BIOS storage is reclaimed and can be used as system memory.

Figure 4:
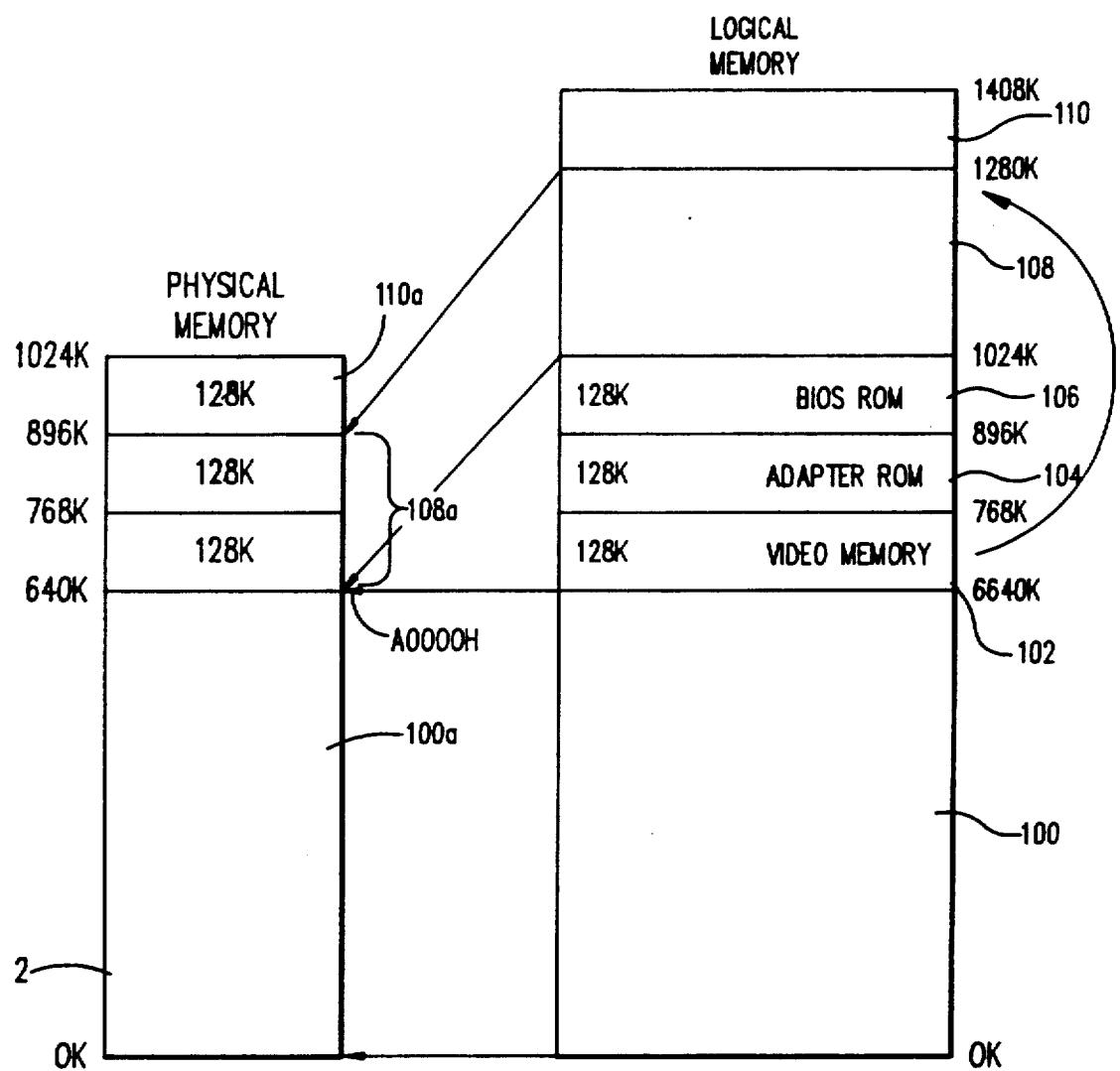
FIG. 4 is a memory map for a one megabyte system where RAM memory between 640–896 K is reclaimed.

For the purposes of explanation, it is important for the understanding of this invention to show a memory map for a one megabyte RAM system configuration. FIG. 4 illustrates such a memory map for a one megabyte system according to the present invention. It is to be understood however, that the present invention will work with greater than one megabyte systems.

Conventional memory 100 and 100a extends from 0 to 640 K. The reference to letter (a) signifies the memory is in physical address space. This is the amount of memory that is typically available for application program execution. Thus, the memory controller 52 directly maps logical memory addresses from 0-640 K to physical memory address 0-640 K.

The remaining portions of logical memory (102, 104, 106) (640-1,024 K) are reserved for operating system software. In particular 640-768 K is used for video memory 102, 768-896 K is employed for adapter ROM 104, and 896K-1024 K is used for ROM-BIOS 106.

According to the present invention, the last 128 K of ROM-BIOS 106 is the portion of RAM that is selectively reclaimable. This is accomplished by program inputs into the memory controller to modifying the address selections from the CPU to effectively map any addresses within the range of 1280-1408 K (110) into RAM from 896-1024 K (110a) respectively. At the same time, the memory controller enables ROM-BIOS 106 so that any addresses between the range of 896-1024 K are executed by ROM-BIOS 106 on the planar. This combination creates the effect of increasing conventional memory by 128 K.

As was explained in the background of the invention, certain application programs requiring a full one (1) megabyte (MB) of memory will not execute on machines equipped with only 1 MB of memory because of the memory lost to the video memory, adapter ROM, and BIOS (assuming BIOS executes out of RAM). During initial start up of the machine an initialization program named POST (Power On Self Test) in BIOS executes out of ROM at power on time. Previously, during POST, the first megabyte of RAM is split (divide conventional memory from operating system memory) at either the 512 K boundary or the 640 K boundary (A0000H-AFFFFH) to make room for video memory 102, (A0000H to BFFFFH), Adapter Card ROM 104 (C0000H to DFFFFH), and BIOS-ROM 106. The 512 K split is representative of systems which have only 512 KB of RAM. For purposes of illustration, however, the explanation that follows will refer only to one megabyte of RAM as exemplified in FIG. 4 and having a 640 K boundary between conventional memory and operating system memory. It being understood that other configurations of memory are applicable according to the present invention.

Referring to FIG. 4, if the split occurs at the 640 K boundary there is 384 KB of RAM 108a and 110a remaining. This 384 KB is placed after the last full meg of memory starting at a megabyte boundary (such as 1024 KB) 108 and 110. The addresses assigned to the split memory will be referred to as the logical split addresses (108 and 110). The address where the split occurs will be referred to as the boundary address. Correspondingly, the real addresses will be referred to as physical addresses. For example, if there were only one megabyte then the split memory would be placed at the one megabyte boundary with a corresponding logical split address of 1024 KB. If there were 4 megabytes in the system, then the split memory would be placed at the 4 megabyte boundary with a logical split address of 4 megabytes. For illustration purposes, the following will only refer to the 384 KB size split (640 K split address) except where there are differences between the two sizes of splits. However, anything that applies to the 384 KB (640 K boundary address) size split also applies to the 512 KB size split (512 K boundary address).

Referring further to FIG. 4, the 384 KB of split memory is divided into two sections. The first section 104 is 256 KB (640-896 K) in size, the second section 106 is 128 KB (896-1024 K). The 256 KB section 108 remaps as described previously, after the last full megabyte. That is, the logical memory section 108 corresponds to physical memory section 108a. However, the second section 110 of 128 KB (896-1024 K) does not remap after the 256 K is moved. Previously, this 128 K (BIOS) always responded to the real physical addresses E0000H through FFFFFH. Because of previous hardware constraints, when BIOS was executing from ROM-BIOS 106 (E0000H through FFFFFH), it was enabled for reads only, the 128 KB RAM section 110a that was used was enabled for writes only. This permitted POST to copy BIOS from ROM to RAM. After copying BIOS from ROM to RAM, known as remapping BIOS, POST directs the memory controller to disable ROM and enable RAM for reads. Along with enabling RAM, RAM also became write protected to prevent changes to BIOS during system operation.

Referring to previous systems, it should now be evident that if ROM 106 was re-enabled for reads, that the 128 KB section 110a of RAM would not be usable by the processor. The RAM, after ROM was re-enabled, still would decode for real physical addresses between E0000H and FFFFFH and for write operations only. The previous hardware implementation prevented redirecting the address decodes of the 128 KB RAM section 110a, therefore the 128 KB of RAM 110a was not reclaimable in the physical memory address space, but was lost.

Figure 5:
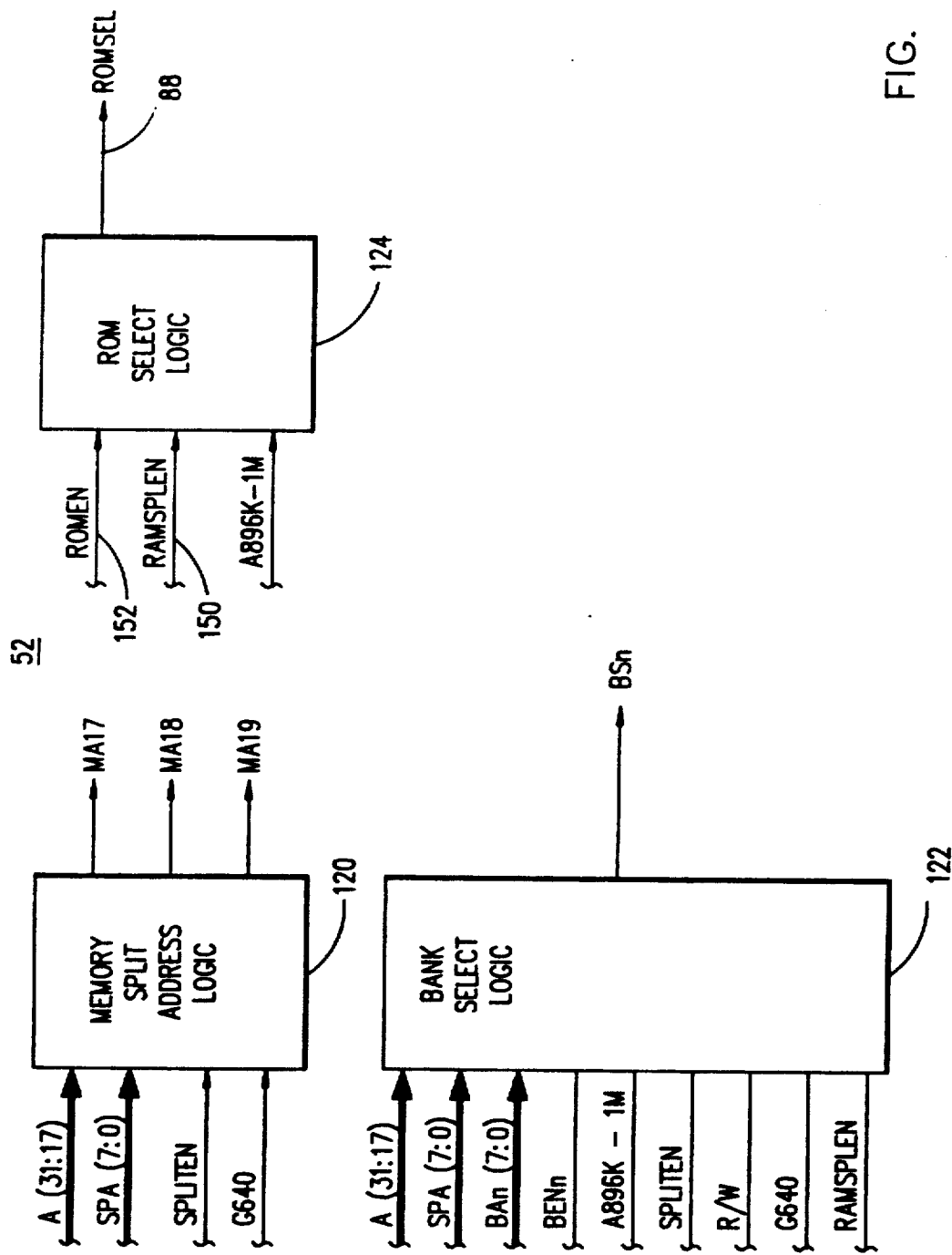
FIG. 5 illustrates a memory controller according to the present invention which permits the user to either use BIOS out of ROM (reclaiming RAM) or using BIOS out of RAM (losing the ability to reclaim RAM).

The memory controller 52 according to the present invention, shown in FIG. 5, is designed to allow the 128 KB of RAM 110a that is carved out for the remap to be reclaimable in the system memory address space and permits the user to select either reclaiming this section of RAM or not. The memory controller 52 is comprised of a memory split address logic 120, bank select logic 122, and ROM select logic 124. These logic gate arrays have the following hardware capabilities:

The 128 KB RAM used for Remap will be addressable at either the E0000H-FFFFFH physical addresses or as part of the 384 KB split that results from the split of the first MB of memory. This 384 KB split is placed after the last full MB of memory in a 386/386 SX system.

When the 128 KB of RAM includes BIOS at the E0000H-FFFFFH area, the memory will be write protected. This makes the memory appear as ROM and prevents intentional or accidental modifications to BIOS.

When the 128 KB of RAM is reclaimed in the system memory address space it will be read and writable.

Control signals exist to switch BIOS between ROM active or RAM active (ROM inactive) at the E0000H-FFFFFH real physical addresses.

Two signals to the memory controller 52 are required in order to implement RAM reclaiming. One signal controls the address decode of the 128 KB of RAM being reclaimed. The second signal controls the selection of execution of ROM or RAM when in the E0000H-FFFFFH area. The first signal 150 is referred to as RAMSPLEN or RAM Split enable. The second signal 152 is the ROMEN used as an input to the ROM select logic gate array 124.

RAMSPLEN is used to indicate to the memory controller 52 where the 128 KB of RAM is to be decoded. RAMSPLEN 150 is essentially a bit set in memory controller 52 that is programmably set usually by POST. If the bit is set RAMSPLEN is active, if the bit is off RAMSPLEN is inactive. If the RAMSPLEN control bit is inactive, the 128 KB of RAM is decoded at E0000H-FFFFFH real physical addresses. If the RAMSPLEN control bit is active, the 128 KB of RAM remains with the 384 KB split of the first megabyte of memory.

ROMEN 152 is used to enable or disable use of ROM. If ROMEN is disabled, ROMSEL is active and ROM responds to addresses in the E0000H-FFFFFH area (i.e. BIOS is executed out of ROM). If ROMEN is enabled, ROMSEL is inactive and ROM does not respond to any address and is not useable by the system microprocessor for BIOS (the E0000H-FFFFFH area).

A decision table with the two signals is as follows:

| RAMSPLEN | ROMEN | Explanation | Result |
|---|---|---|---|
| inactive | inactive | Execution from ROM; RAM at E0000H-FFFFFH is write only | ROMSEL active |
| inactive | active | Execution from RAM; RAM at E0000H-FFFFFH; ROM not visible to microprocessor | ROMSEL inactive |
| active | active or inactive | Execution from ROM; RAM addressed at logical address as previously described | ROMSEL active |

Note:
ROM addresses as used in this table refer to E0000H to FFFFFH area.

The following logic implemented in logic gate arrays 120-124 shows the necessary logic implement the above and to perform BIOS RAM reclaiming. The BSO signal selectes memory bank 0 which contains the physical RAM. Only three (3) memory address lines, MA(19:17) are affected in the process of mapping logical split address to physical address.

```
LT256M =      /(A31 + A30 + A29 + A28)
SPAEQ =       /(A(27:20)   SPA(7:0)) & SPLITEN
SPLDEC =      (/A19 & /A18)
              + (/A19 & A18 & /A17 & (G640 + /RAMSPLEN))
              + (/A19 & A18 &  A17 & G640 & /RAMSPLEN)
SPADEN0 =     /(BA0(7) + BA0(6) + BA0(5) + BA0(4) + BA0(3) + BA0(2)
              + BA0(1) + BA0(0) + BEN0)
NOMEM =       A896K_1M & ((W/R   ROMEN) + RAMSPLEN)
BS0 =         LT256M & SPAEQ & SPLDEC & SPADEN0 & /NOMEM
MA19 =        A18   SPAEQ
MA18 =        (/SPAEQ & A18) + (SPAEQ & /A18 & /A17) + (A18 & A17) +
              (A18 & /G640)
MA17 =        A17 + (A18 & /G640 & SPAEQ)
ROMSEL =      M/IO & [/RAMSPLEN+(RAMSPLEN & ROMEN)] & A896K_1M
DEFINITION:
A896K_1M :    Physical address between 0E0000H to 0FFFFFH
A(31:0) :     CPU or Bus Master Address
BA0(7:0) :    Base Address 0
BEN0 :        Bank Enable 0
BS0 :         Memory Bank Select 0
SPA(7:0) :    Split Address register
RAMSPLEN :    Ram Split Enable bit is used for reclaiming BIOS
              RAM, active low
SPLITEN :     Split Enable bit is used for enabling split address,
              active high
G640 :        Select split address block
              0 = 640K - 896K is mapped to split address
              1 = 512K - 896K is mapped to split address
MA(19:17) :   Memory Address. These are RAS address.
ROMEN :       Enable or disable ROM
M/IO :        CPU control signal designating CPU cycle as either
              memory or I/O space
W/R :         CPU control signal designating CPU cycle as either
              read or write operation

/ : NOT
& : AND
+ : OR
  : XOR
```

In operation, the memory split address logic generates memory address outputs MA17, MA18 & MA19 used to control the memory address lines from 512 K to 1024 K. These lines map the logical addresses above 1024 K to physical addresses below 1024 K. The bank select logic generates the bank select, BSO; used to activate memory bank 0 between E0000H-FFFFFH.

The bank selects refer to the actual hardware chips used for memory.

The LT256M, SPAEQ, SPLDEC and SPADEN0 are internal signals to the memory controller which are used to generate the logic for the outputs MA(19:17) and BS0. The LT256M is active when addresses are below 256 Megabytes (MB). The split address equal "SPAEQ", is active when addresses A(27:20) are equal to split address register, SPA(7:0), and the SPLITEN signal is also enabled. For example, in the one megabyte case; SPAEQ=1024 K. The split address decode, SPLDEC, is active when the logical split address is detected. That is when the microprocessor addresses any address above 1024 K, the split address decode is active.

The split address enable, SPADEN0, is active when the appropriate base address register, BA0(7:0), contains the split ram address, E0000H-FFFFFH, and the associate bank enable, BEN0, is enabled. This signal associates the physical memory address 0 with bank 0. NOMEN signified whether RAM or ROM is being addressed. For the ROM Select logic if there is a memory operation (M/IO active) and RAMSPLEN is active, then ROMSEL is active (enable ROM). If there is a memory operation (M/IO active) and RAMSPLEN is inactive and ROMEN is inactive, then ROMSEL is active. Otherwise ROMSEL is inactive (ROM disabled). Finally, the bank select BS0, is active when LT256M, SPAEQ, SPLDEC and SPADEN0 are all active. Thus, the memory addresses, MA(19:17), will contain the address mapping from the logical addresses to physical addresses.

Referring briefly back to FIG. 4, there is shown a memory map between the logical addresses and physical memory address.

| G640 | RAMSPLEN | FIG. 4 |
|---|---|---|
| ACTIVE | ACTIVE | 110 maps to 110a; 108 maps to 108a |
| ACTIVE | INACTIVE | no mapping for 110; 108 maps to 108a |

Thus, when RAMSPLEN is active and ROMEN is active; ROM is disabled and the memory controller will reclaim physical memory 110a. When RAMSPLEN is inactive and ROMEN is inactive; ROM is enabled and the memory controller will not reclaim physical memory 110a.

With the above control signals implemented by the system memory controller, the system software has the ability to decide whether to reclaim the 128 KB of RAM or not (setting the bit in NVRAM). The bit can be set during a Set Configuration program or can be programmatically changed by the operating system under certain conditions.

Figure 6:
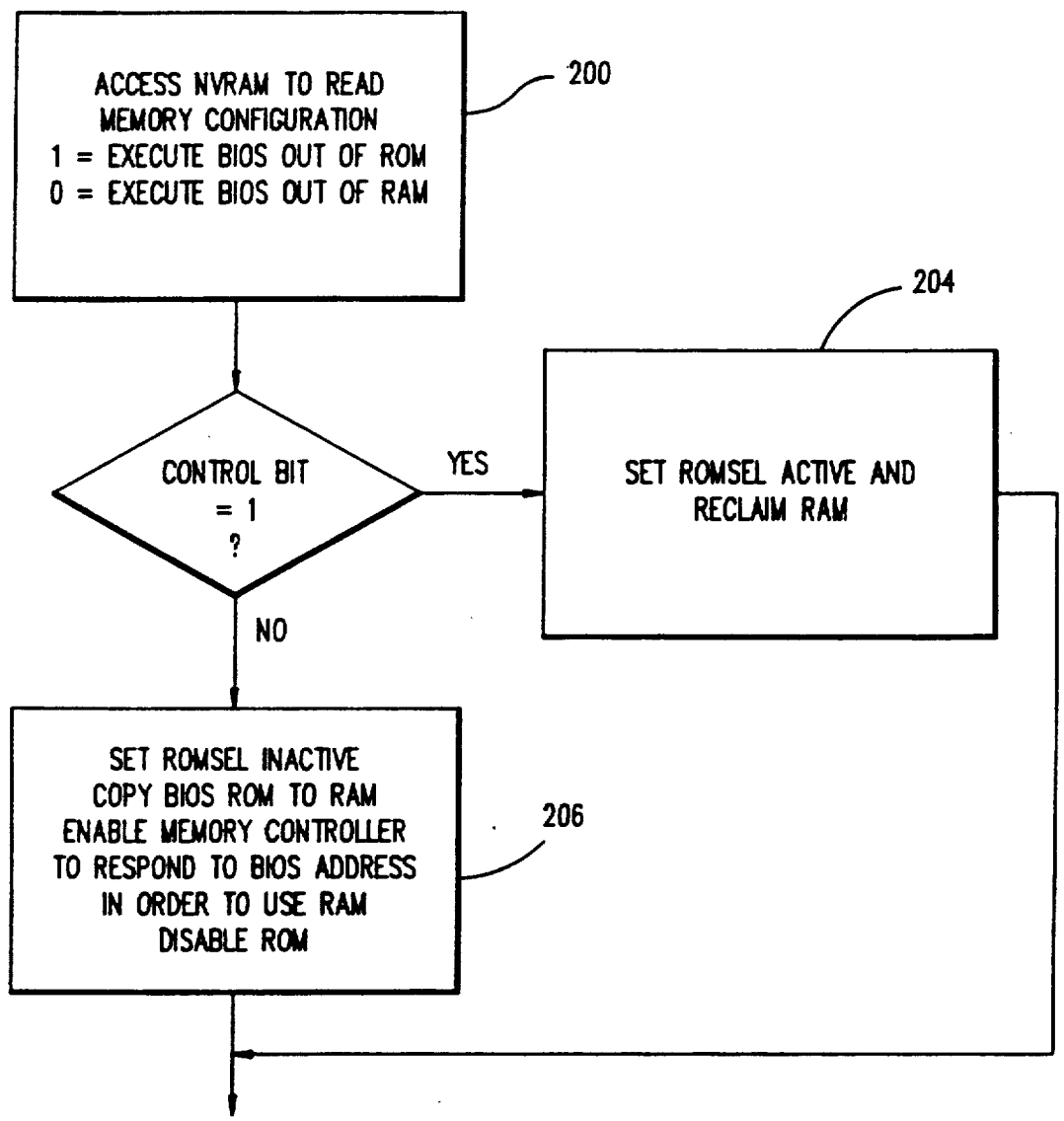
FIG. 6 is a flowchart for enabling the memory controller to either enable or disable ROM.

Referring to FIG. 6, there is shown a simple flowchart to set up the control signals (RAMSPLEN and ROMEN). A Set Configuration Utility will prompt the user when setting up a system if the 128 KB of RAM needs to be reclaimed. Assuming the need to reclaim RAM, the user answers the prompt appropriately. A bit is set in non-volatile storage indicating RAM reclamation is required. This bit will toggle the control signals RAMSPLEN and ROMEN.

During Power On Self Tests (POST), this bit will be retrieved and tested step 200, 202. Since the bit is set to indicate reclamation, POST through the I/O address space of the microprocessor sets the control signals of the memory controller as shown in the Tables above to the appropriate values in order to effect RAM reclamation step 204. If the bit is not set, ROM will be enabled and the 128 KB RAM area will be placed at the logical address, step 206.

POST will then proceed to test memory including the reclaimed RAM and record the amount in the appropriate field in the non-volatile storage. This value will reflect the 128 KB reclaimed. After POST is finished, it boots the operating system. The operating system will then be able to allocate all of memory to itself and the user including the 128 KB of reclaimed RAM.

While the invention has been illustrated in connection with a preferred embodiment, it should be understood that many variations will occur to those of ordinary skill in the art, and that the scope of the invention is defined only by the claims appended hereto and equivalent.

We claim:

1. A personal computer system compatible with application programs and operating system software, said personal computer system comprising
   a high speed microprocessor coupled to a data bus;
   non-volatile memory electrically coupled to the data bus, said non-volatile memory including a non-volatile operating system portion for storing operating system microcode;
   volatile memory electrically responsive to the data bus, said volatile memory including a volatile operating system portion intended for use by he operating system microcode during operation of the personal computer system;
   a memory controller electrically coupled to said microprocessor, said volatile memory and said non-volatile memory, said memory controller regulating communications between said volatile memory, said non-volatile memory and said high speed microprocessor; and,
   enabling means for selectively authorizing said memory controller to reclaim said volatile operating system portion of said volatile memory for executing application programs, said microprocessor accessing and executing the operating system microcode from either the non-volatile portion or the volatile operating system portion based upon said enabling means.

2. The personal computer system of claim 1, wherein said operating system microcode includes BIOS.

3. The personal computer system of claim 1, wherein said enabling means further includes a non-volatile memory adapted for storing information regarding whether said operating system portion of said volatile memory has been reclaimed.

* * * * *